US005478187A

United States Patent [19]

Gearin et al.

[11] Patent Number: 5,478,187

[45] Date of Patent: Dec. 26, 1995

[54] HANDLING APPARATUS FOR COLLAPSIBLE LIGHTWEIGHT CARGO CARRYING SLEEVES

[75] Inventors: Peter Gearin, Portland; Terence Halpin, West Linn, both of Oreg.; Donald L. Kiive, Brush Prairie, Wash.; William Youngblood, Beaverton, Oreg.; Robert Peterson, Gresham, Oreg.; Gerald Popp, Woodburn, Oreg.; Stephen Farrow, Beaverton, Oreg.

[73] Assignee: G & G Intellectual Properties, Inc., Portland, Oreg.

[21] Appl. No.: 984,854

[22] Filed: Dec. 3, 1992

Related U.S. Application Data

[63] Continuation of Ser. No. 656,833, Feb. 19, 1991, Pat. No. 5,215,424.

[51] Int. Cl.$^6$ .......... B60P 1/64

[52] U.S. Cl. .......... 414/416; 414/390; 414/400

[58] Field of Search .......... 414/416, 453, 414/618, 395, 400, 626, 908; 294/93; 53/468, 471; 220/1.5, 6

[56] References Cited

U.S. PATENT DOCUMENTS 3,534,520 10/1970 Moran .......... 53/416
3,747,786 7/1973 Reichert .......... 414/416
3,865,269 2/1975 Coleman .......... 220/6
4,919,582 4/1990 Bates et al. .......... 414/416 X

*Primary Examiner*—Frank E. Werner
*Attorney, Agent, or Firm*—Chernoff, Vilhauer, et al.

[57] ABSTRACT

A handling apparatus pulls a group of lightweight cargo carrying sleeves out of a container in which they have been transported onto a storage bed. The collapsed sleeves are individually supported in an upright orientation on the bed by fingers which can be selectively withdrawn from a sleeve when it is to be removed. An overhead crane has a carriage that translates across the sleeves on the storage bed and a sleeve loading and unloading apparatus that is positioned beside the bed. The carriage can also be raised and lowered. The carriage carries hooks which engage the sidewalls of the sleeves and can be moved toward and away from one another. After the hooks engage the sidewalls of a sleeve the carriage is raised to lift the sleeve out of the group. The carriage is then moved above the loading apparatus and the hooks are moved apart from one another to expand the sleeve. Finally, the carriage is lowered to place the expanded sleeve on the loading apparatus and the hooks are disengaged from its sidewalls. The apparatus includes a sled that traverses the storage bed and is used to pull a group of sleeves out of the cargo container in which the group has been transported. The apparatus is used to remove sleeves from the loading apparatus by reversing the above-described procedure.

14 Claims, 9 Drawing Sheets

HANDLING APPARATUS FOR COLLAPSIBLE LIGHTWEIGHT CARGO CARRYING SLEEVES

This is a continuation of application Ser. No. 07/656,833 filed on Feb. 19, 1991, now Pat. No. 5,215,424.

BACKGROUND AND SUMMARY OF THE INVENTION

This invention relates to an apparatus for erecting and positioning lightweight cargo carrying sleeves.

Gearin et al. U.S. Pat. No. 4,768,916 discloses a lightweight sleeve that facilitates placement of cargo into a standard cargo container of the type that is transported in ships, rail cars and trailers. Application Ser. No. 07/297,061 , now U.S. Pat. No. 4,957,407 discloses a loading apparatus for rapidly loading and unloading cargo into such a sleeve.

These sleeves are collapsible, which allow several of them to be placed in a single container when it is necessary to return them empty. However, the sleeves are quite large so that pulling collapsed sleeves out of the cargo container, opening them to their expanded configuration and placing them on the loading apparatus is difficult and can slow down the entire loading operation. Similarly, after the sleeves are emptied, they must be removed from the loading apparatus, collapsed, and placed into a cargo container which requires the same effort.

The subject invention overcomes the foregoing difficulty by providing an apparatus which removes a group of collapsed sleeves from a cargo container as a unit and places them on a storage bed. The apparatus then lifts the sleeves from the storage bed one at a time, expands them and places them in the proper orientation on the loading apparatus. The apparatus reverses this sequence with sleeves that have just been emptied.

The sleeves are supported individually on the storage bed in an upright position with their sidewalls vertical, thereby permitting one of the sleeves to be removed without disturbing the rest of the sleeves in the group. In a preferred embodiment this is accomplished by providing a plurality of fingers which are placed alongside of the sleeves' sidewalls. The fingers at one end of the sleeves are carried on a gate which is attached to a movable sled. The sled can be coupled to a group of sleeves in the cargo container and pull the group onto the bed. The fingers are slidably mounted on a gate attached to the sled so that they can be retracted out of engagement with the sleeve when the sled is being used to pull the sleeves out of the container. The fingers at the other end of the sleeves are mounted on pivotal gates which can be raised to permit the group of sleeves to be pulled onto the bed. These fingers are also slidably mounted in order to allow the gate to be lowered after the sleeves have been pulled past it.

An overhead crane is used to lift the collapsed sleeves off of the storage bed, expand them and place them on the loading apparatus. A carriage associated with the crane can be raised and lowered and moved transversely across the storage bed and the loading apparatus. The carriage has hooks slidably mounted on it. The hooks are arranged in pairs which move relative to one another, with one pair of hooks being located over each end of the sleeves. When the hooks are brought together they can be inserted between the sidewalls of a collapsed sleeve. When the hooks are then separated from one another they engage the sidewalls.

After the hooks have engaged the sidewalls of a sleeve, the carriage is raised to lift the sleeve off of the storage bed. The raised sleeve is moved over the loading apparatus, and the hooks are separated from one another to open the sleeve to its expanded position. The carriage is then lowered to place the expanded sleeve on the loading apparatus, and the hooks are moved together to disengage them from the sleeve sidewalls.

The sleeves are removed from the loading apparatus, collapsed, and placed on the storage bed by reversing the aforesaid procedure.

Accordingly, it is a principal object of the present invention to provide an apparatus which will remove lightweight cargo carrying sleeves one at a time from a group of collapsed sleeves located on a storage bed, open the removed sleeves and place them on a loading apparatus.

It is a further object to provide such an apparatus which will remove an empty sleeve from the loading apparatus, collapse it and place it into a group of sleeves on the storage bed.

It is a further object of the present invention to provide such an apparatus which will pull a group of collapsed sleeves from a cargo container as a unit and place it on the storage bed.

It is a still further object of the subject invention to provide such an apparatus which will push a group of collapsed sleeves off of the storage bed as a unit and place it into a cargo container.

It is a still further object of the subject invention to provide such an apparatus in which each sleeve in a group of sleeves is individually supported on the storage bed in an upright position.

The foregoing and other objectives, features and advantages of the present invention will be more readily understood upon consideration of the following detailed description of the invention taken in conjunction with the accompanying drawings.

PREFERRED EMBODIMENT

Figure 1:
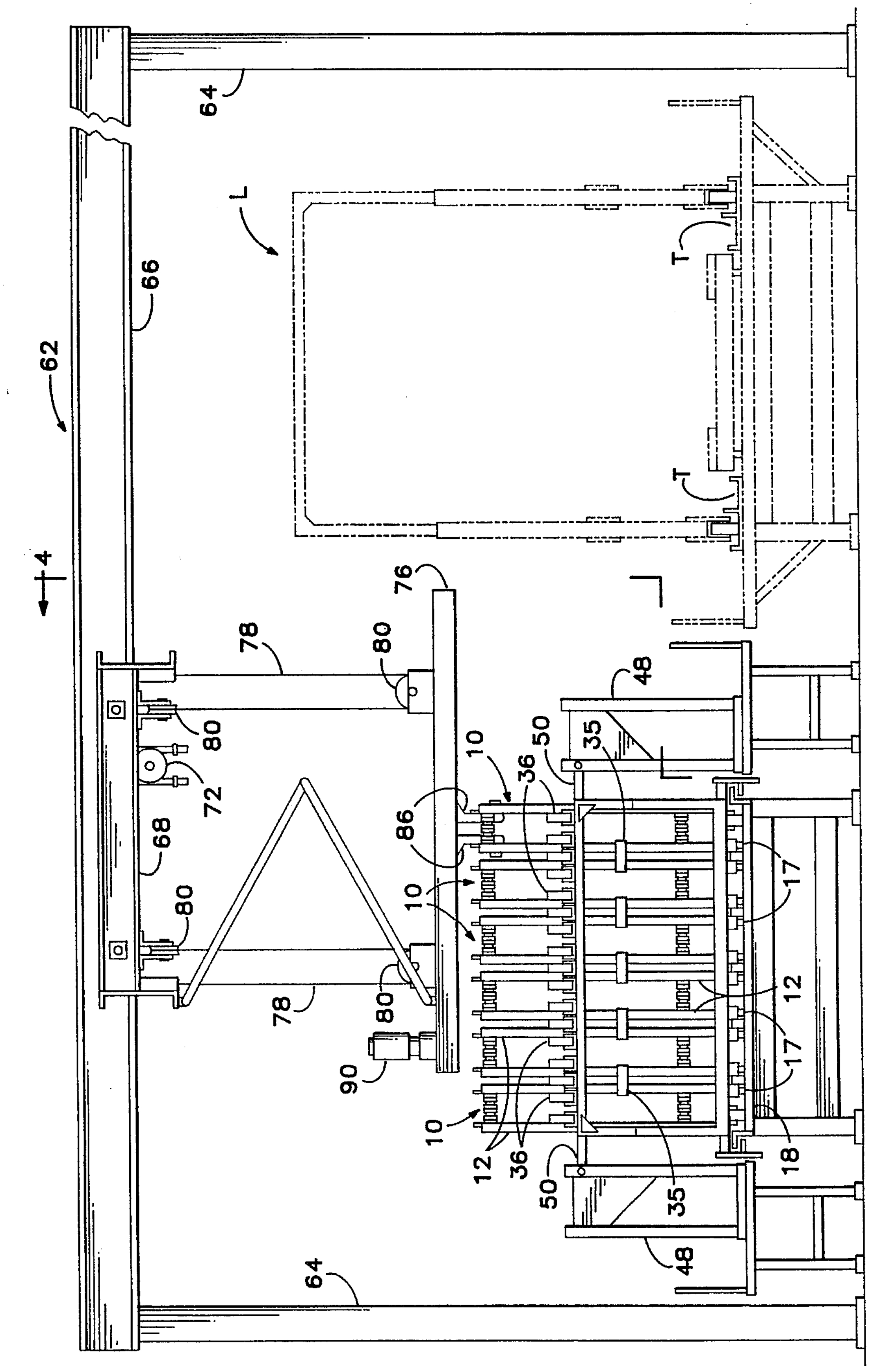
FIG. 1 is a foreshortened end elevation view of a handling apparatus embodying the subject invention, with a loading device shown in phantom line.

The present invention is used for handling lightweight cargo carrying sleeves 10 of the type described in Gearin et al. U.S. Pat. No. 4,768,916, which is incorporated herein by reference. The sleeves in Gearin et al. have spaced apart sidewalls 12 which are joined at one end by a gate 14 and at the other end by a bar (not shown). The gate 14 is attached to the sidewalls 12 by hinges 15 and is divided by central hinges 16 which allow it to be folded inwardly. Thus, the sleeve can be collapsed to where its sidewalls are in side-by-side adjacency for transportation when empty. The bar at the other end of the sleeve is removable to allow collapsing of the sleeve, but adds rigidity when the sleeve is in its expanded configuration. Wheels 17, located at spaced apart intervals along the bottom of the sidewalls 12, permit the sleeve to be rolled in a direction parallel with the sidewalls.

Referring to FIGS. 1 through 5 of the drawings, a preferred embodiment of the invention includes an elongate bed 18 which supports a plurality of the collapsed sleeves 10 in side-by-side adjacency. The bed is elevated to a level coplanar with the bed of a trailer 20, FIG. 5, in which the sleeves are transported.

Figure 5:
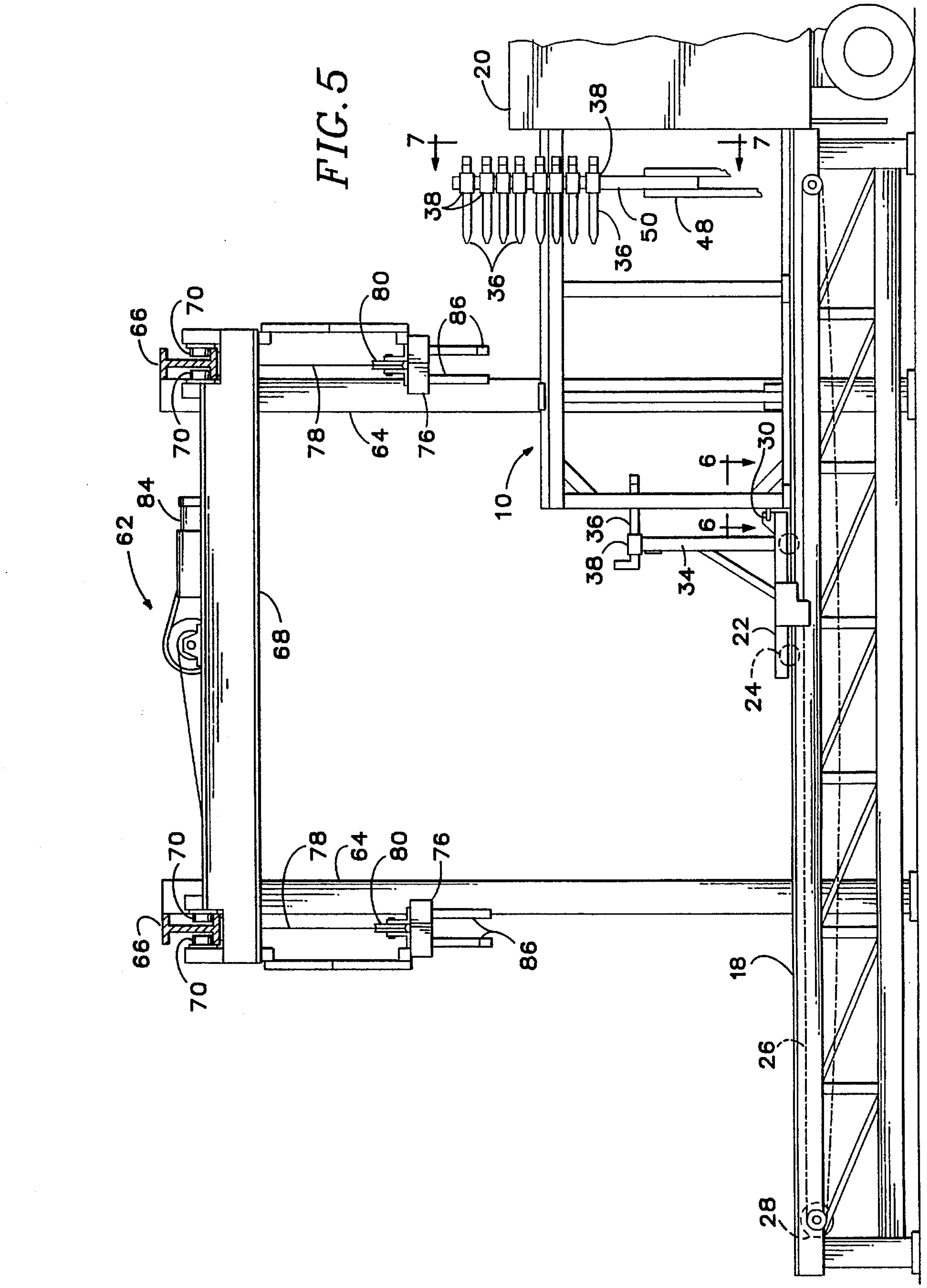
FIG. 5 is a side elevation view, similar to FIG. 4, showing the sequence of operation of the device.
Figure 6:
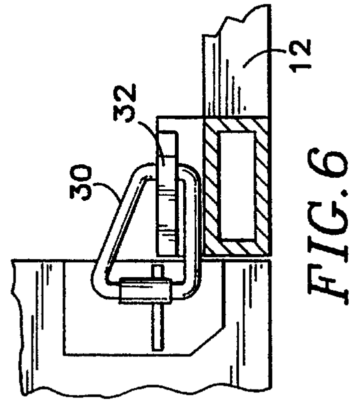
FIG. 6 is a sectional view taken on the line 6—6 of FIG. 5.

A sled 22, having wheels 24, rides on the bed 18 and is movable along the bed by means of an endless chain 26 that is driven by a motor 28. Located at each corner of one end of the sled 22 is a ring 30, FIG. 6, that fits over a hook 32 mounted on each sleeve. Thus, the sled can be attached to the group of sleeves and used to pull the group out of or push the group into the trailer, as shown in FIG. 5. Clamps 35 hold the group of sleeves together during this process.

Figure 7:
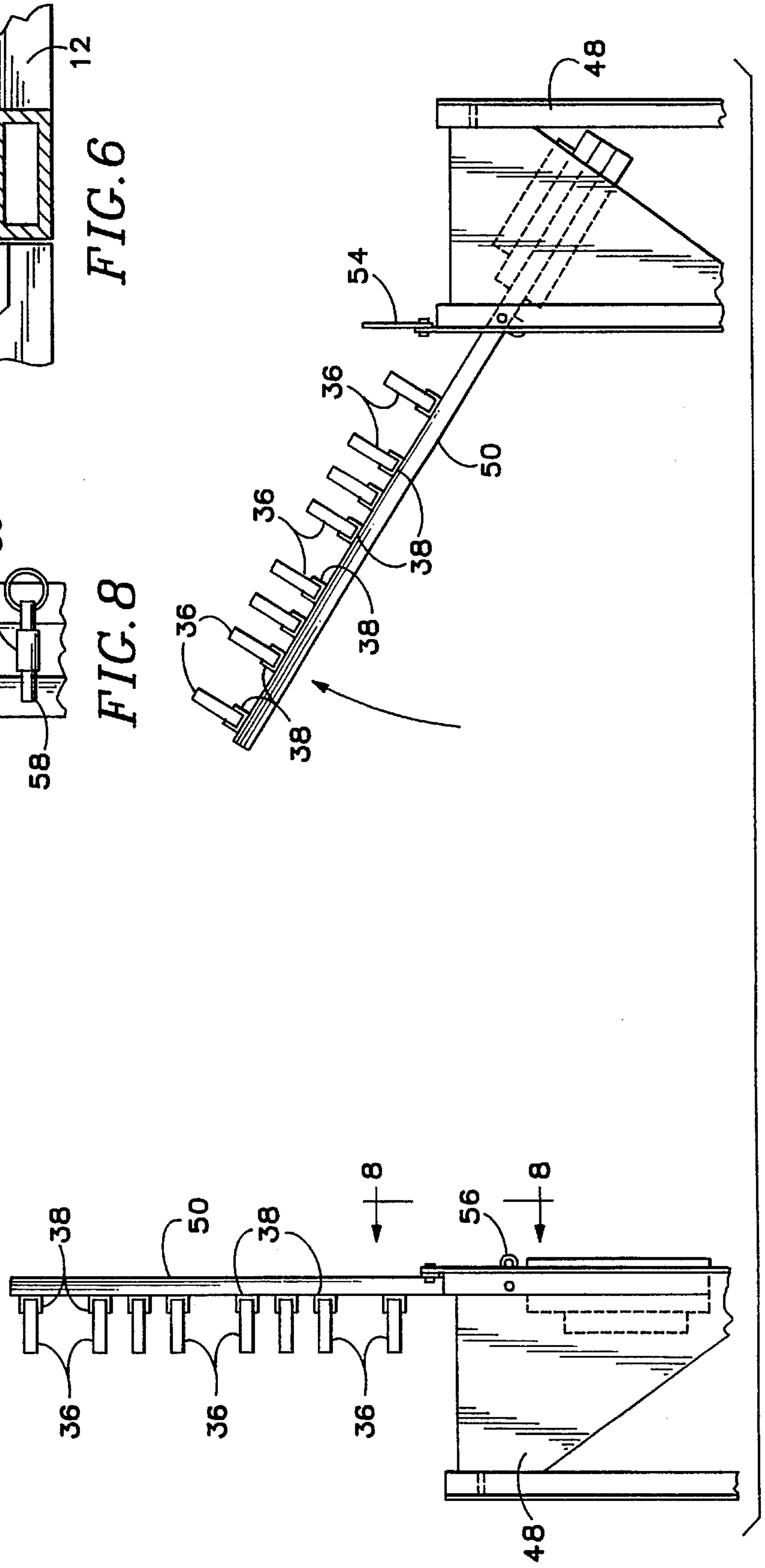
FIG. 7 is a sectional view taken on the line 7—7 of FIG. 5.

Mounted on the sled 22 is a gate 34 which extends upwardly to approximately the middle of the sleeves and extends across their ends. Located at the top of a gate is a plurality of fingers 36. The fingers are positioned so that one contacts each side of both sidewalls 12 of every sleeve in the group, except that the outside sidewall of the outer sleeves in the group are not contacted by a finger. The fingers are slidably carried in collars 38. Thus, the fingers can be moved between engaged positions, where they contact the sidewalls, and disengaged positions where they do not. Located on each side of the end of the bed that receives the trailer 20 is a tower 48. Rotatably mounted on each tower is a gate arm 50 that is movable between an open position, shown in the left hand side of FIG. 7, where it does not extend over the bed, and a closed position, shown in the right hand side of FIG. 7, where it extends halfway across the bed. Slidably carried in sleeves 38 that are mounted on the gate arms 50 are a plurality of fingers 36 that are aligned with the fingers on the gates 34 when the gate arms are in their closed positions.

Figure 8:
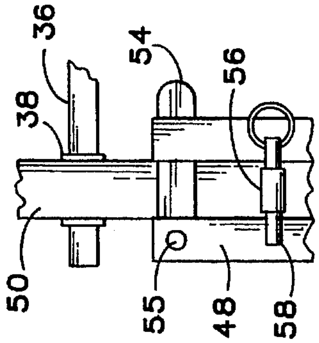
FIG. 8 is a sectional view taken on the line 8—8 of FIG. 7.

Latches 52, FIG. 8, lock the gate arms 50 in their open positions. Each latch includes a bar 54 that is rotatable about a pin 55 between a raised position, where the gate arm can move past it, and a lowered position, where the gate arm cannot move past it. In addition, a collar 56, located on the end of each gate arm, receives a pin 58 when the gate arm is raised and the pin prevents lowering of the gate arm.

A raised catwalk 60 on each side of the bed permits the operator to reach the gate arms 50 and fingers 36.

The apparatus is used in conjunction with an apparatus for loading cargo into and emptying cargo from the sleeves, such as described in application Ser. No. 07/297,061, now U.S. Pat. No. 4,957,407 entitled METHOD AND APPARATUS FOR LOADING AND UNLOADING MOTOR VEHICLES FROM LIGHTWEIGHT SLEEVES WHICH ARE CARRIED IN STANDARD CARGO CONTAINERS.

Figure 2:
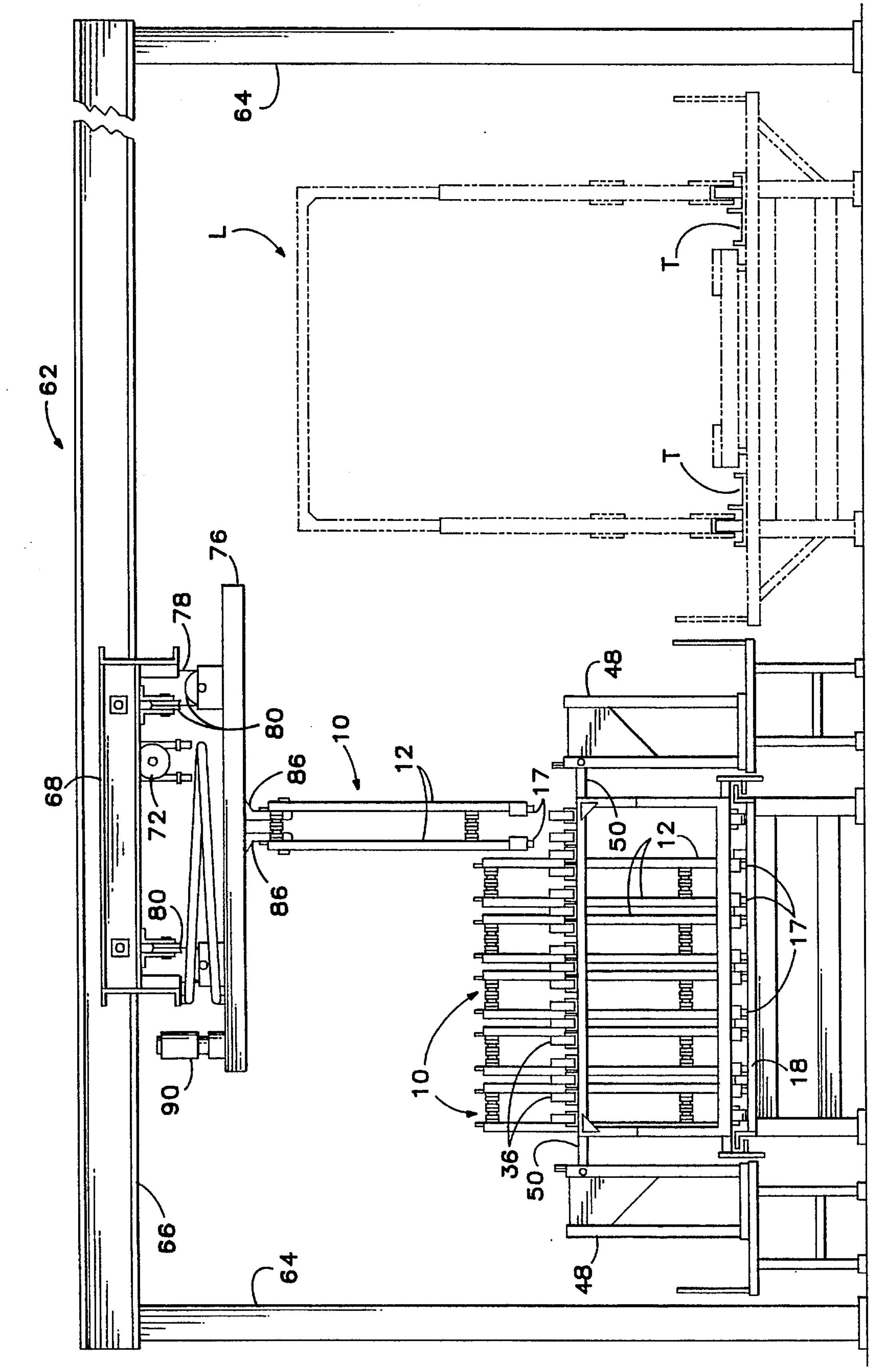
FIGS. 2 and 3 are elevation views, similar to FIG. 1, showing the sequence of operation of the device.
Figure 3:
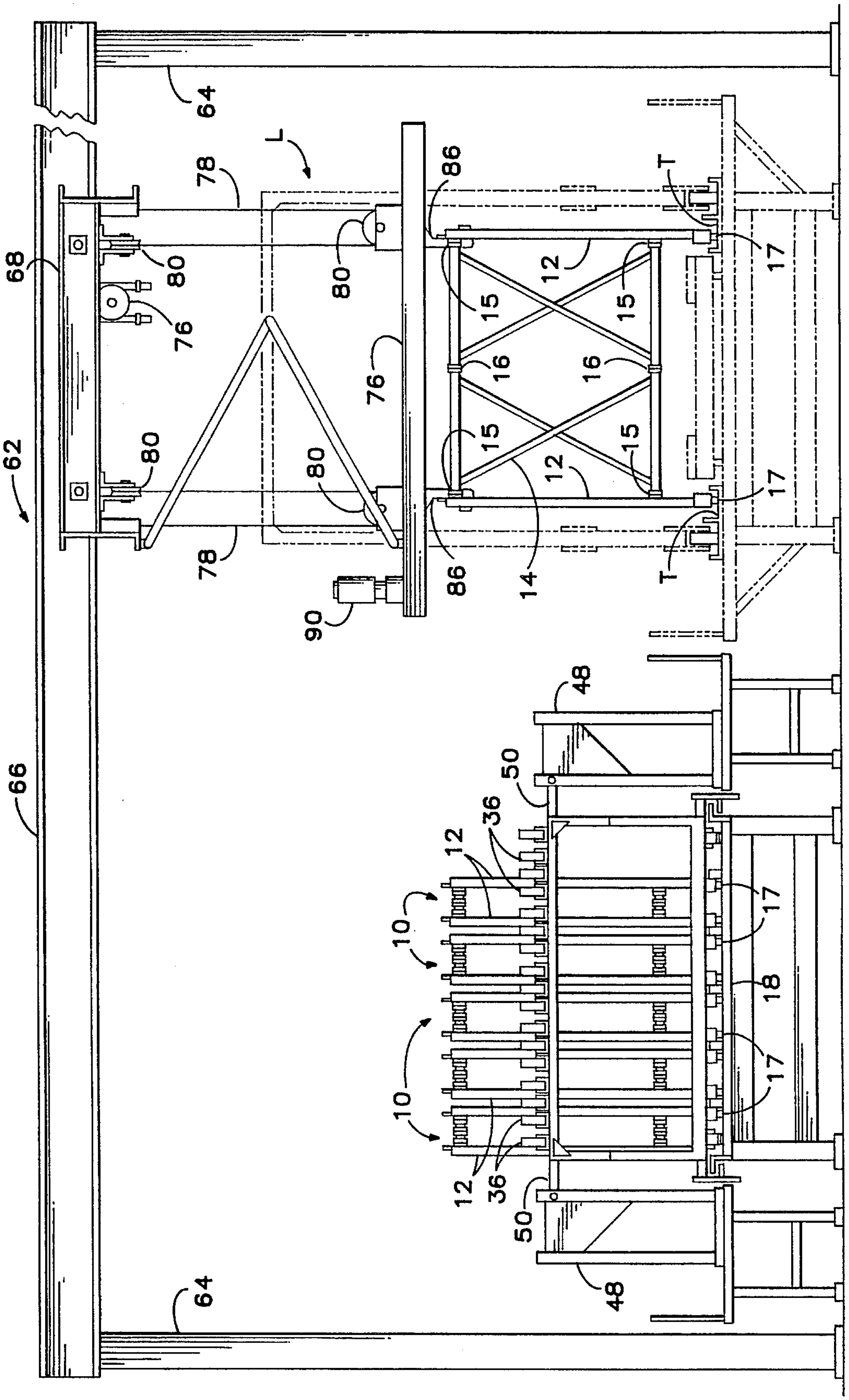
Figure 4:
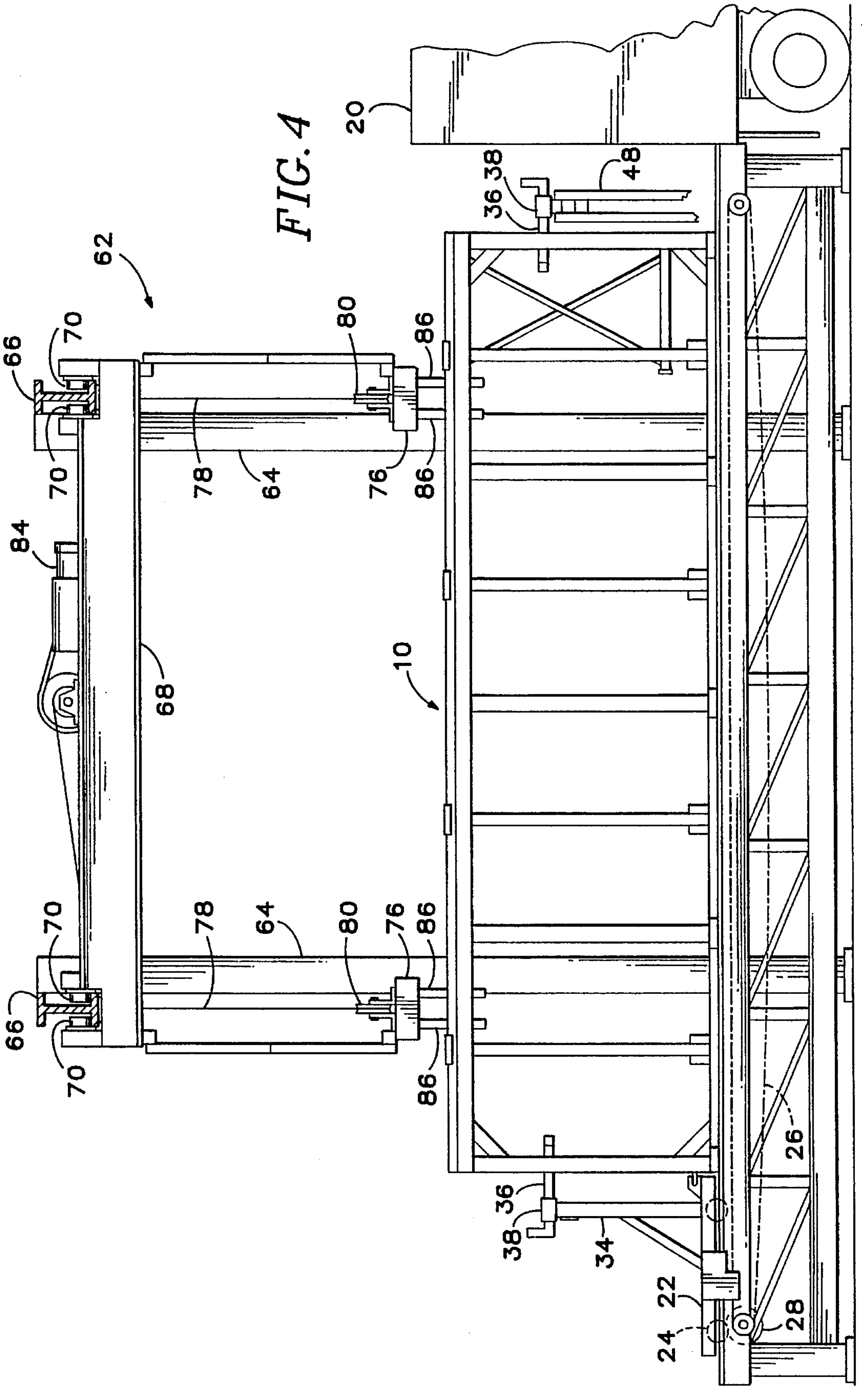
FIG. 4 is a side elevation view of the apparatus of FIG. 1.

The loader, shown in phantom in FIGS. 1–3, is placed alongside of and parallel with the bed 18. Extending above both the bed 18 and the Loader L is an overhead crane 62 that is used to lift collapsed sleeves off of the bed, open them to their expanded orientation, and place them on the loader.

Figure 9:
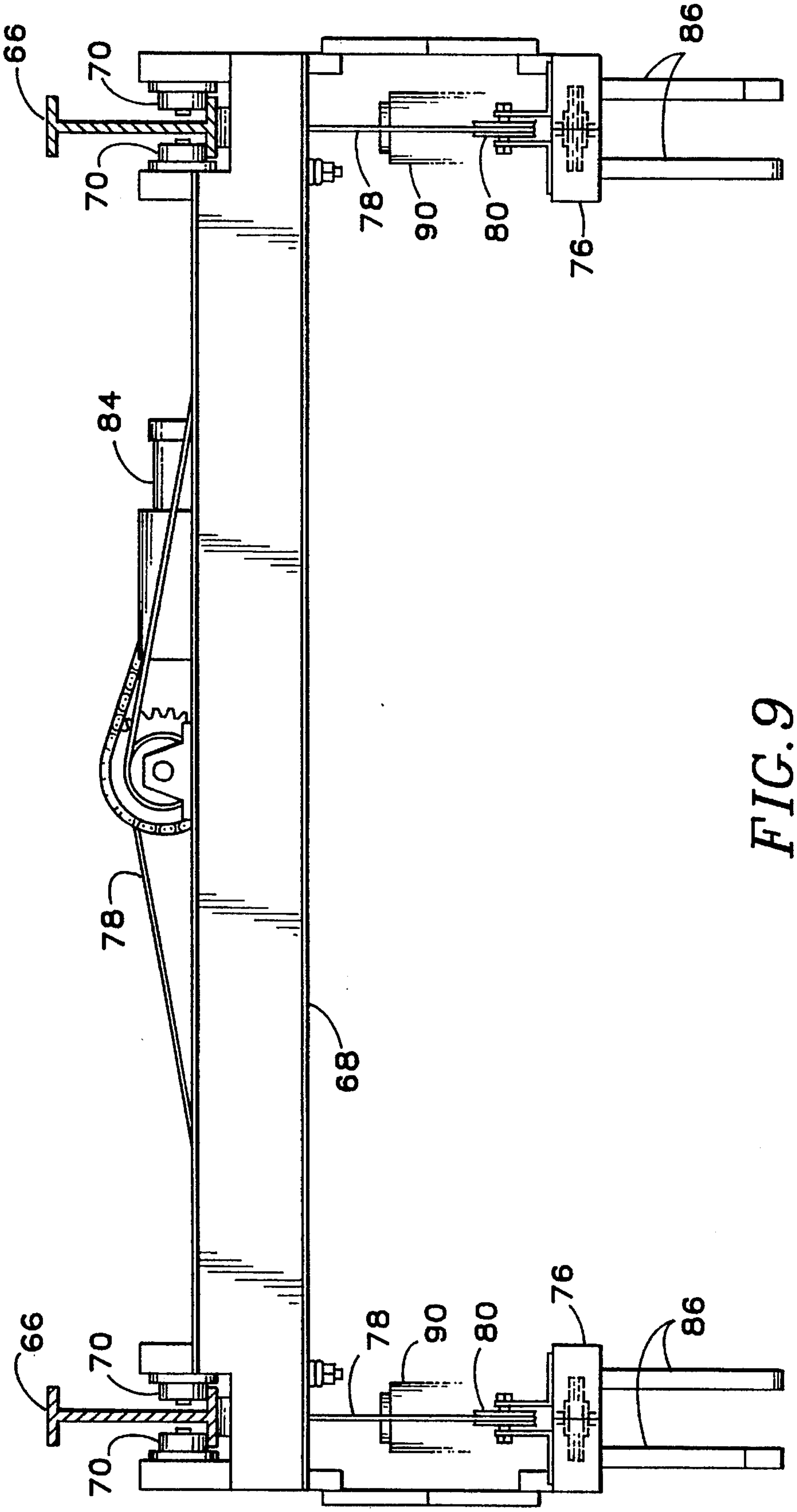
FIG. 9 is a side elevation view, at an enlarged scale, showing a portion of the device.
Figure 10:
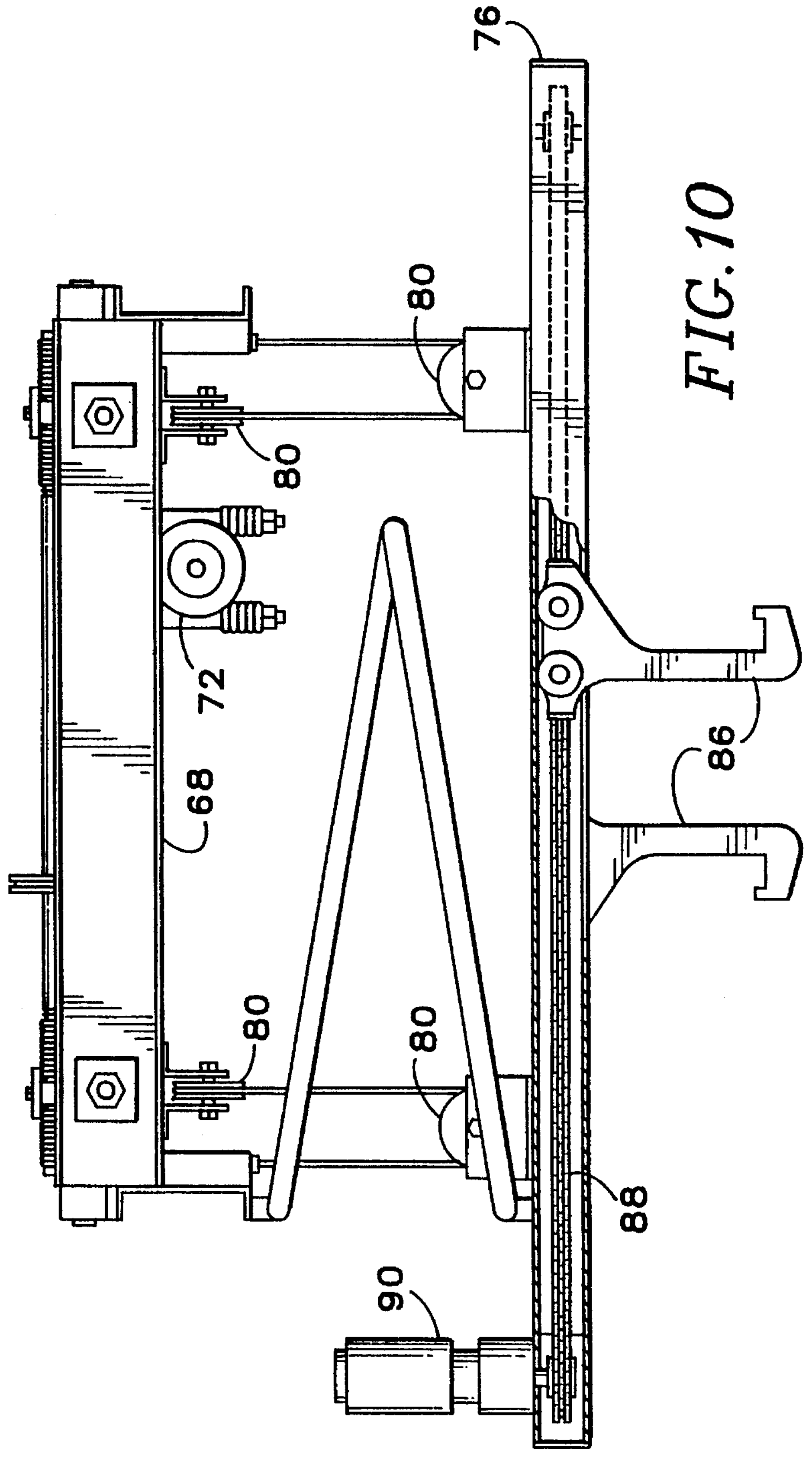
FIG. 10 is an end elevation view of the portion of the device shown in FIG. 9.
Figure 11:
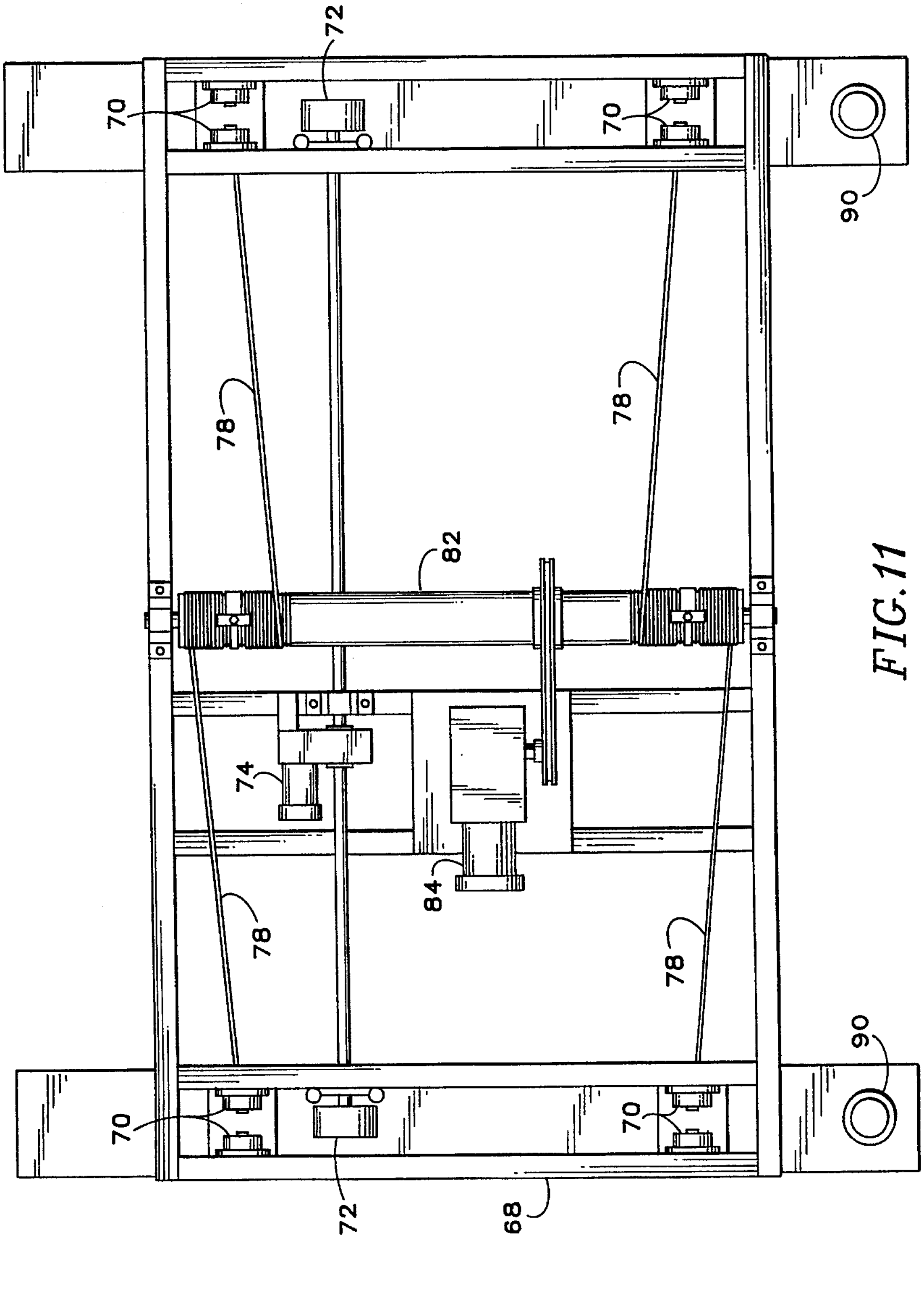
FIG. 11 is a plan view of the portion of the device shown in FIG. 9.

The crane comprises four upright posts 64, positioned in spaced—apart pairs on each side of the bed/loader. Crossbeams 66 span the respective posts in each pair. Referring now also to FIGS. 9–11, a dolly 68 is suspended from the crossbeams by means of wheels 70. Drive rollers 72, which engaged the crossbeams, are driven by a reversible motor 74. The motor can be either electric or hydraulic and is operated by a controller (not shown) that is conveniently positioned for the operator of the apparatus. The dolly 68 carries a pair of carriage elements 76 through a cable 78 and pulley 80 arrangement which allows the carriage elements to be raised or lowered by rotating a drum 82 that the cable is wound on. A reversible motor 84, that is operated by the same controller that operates the motor 74, rotates the drum to raise and lower the carriage elements. As can be best seen in FIG. 10, each carriage element 76 has two hooks 86 slidably mounted on it which are arranged to engage the sidewalls of a sleeve. The hooks are attached to opposed sides of an endless cable 88 that is driven by a two-way motor 90. The motor 90 also is operated by the controller that operates the motors 74 and 84. When the motor 90 is operated in one direction the hooks move toward one another and when it is operated in the opposite direction the hooks move away from one another.

Referring now to FIG. 5, when the device is used to unload sleeves from a trailer 20, the bars 54 are raised and the gate arms 50 rotated to their open positions. The bars 54 are then lowered and the pins 58 inserted into the collars 56 to lock the gate arms in their open positions. The fingers 36 in the gate 34 are moved to their disengaged position, and the motor 28 is operated to move the sled 22 to the end of the bed 18 against the trailer 20. The ring 30 is placed over the hook 32 on the sleeves and the motor 28 is operated in the opposite direction to remove the group of sleeves from the trailer and place it on the bed 18.

Once the sleeves are pulled past the gate arms 50 the motor is stopped and the ring 30 uncoupled from the hook 32. The gate arms 50 are then lowered and the fingers 36 on the gate arms and on the gate 34 are moved to their engaged positions against the sleeve sidewalls 12. The clamps 35 are removed and the sleds are individually supported in upright positions by the fingers 36.

The sleeves are now ready to be removed from the bed one at a time. Referring now to FIG. 1, the hooks 86 are brought completely together by the motor 90, and the motor 74, FIG. 11, is operated to move the dolly 68 so that the centered hooks are above the first sleeve. The carriage 76 is lowered by operating the motor 84, FIG. 11, until the hooks are inserted between the sleeve sidewalls 12. The hooks are moved apart from one another and the carriage raised slightly until the hooks engage the sidewalls. The fingers 36 associated with that sleeve are then moved to their disengaged positions and the carriage is raised until the bottom of the sleeve is above the towers 48, FIG. 2. The dolly 68 is moved over the top of the loader L and the hooks moved apart to open the sleeve to its expanded orientation. The carriage is lowered to place the wheels 17 of the sleeve in the tracks T of the loader. The hooks are then moved back together to disengage them from the sleeve, and the carriage is again raised. The sleeve is now ready for loading and removal in the manner described in application Ser. No. 07/297,061. Once the first sleeve has been loaded and removed, subsequent sleeves are placed on the loader in the same manner.

The apparatus is used to remove sleeves that have been unloaded on the loader and place them in groups in the trailer by reversing the above-described operation.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An apparatus for handling lightweight cargo carrying sleeves, said sleeves having side walls and opposed ends, at least one of said ends being covered by a foldable end wall that permits the side walls to be moved relative to one another to allow the sleeve to be moved between an uncollapsed configuration with the side walls spaced apart from one another and a collapsed configuration with the side walls in side-by-side adjacency for storage, said apparatus comprising:

(a) a bed;

(b) means for individually supporting each of a plurality of collapsed sleeves upright on said bed in a side-by-side array of said sleeves such that each sleeve in said array is help upright independent of every other sleeve in said array;

(c) a loader adjacent to said bed; and (d) means for removing said sleeves from said bed individually, one at a time, expanding each removed sleeve to its uncollapsed configuration, and placing the sleeve in said loader in its uncollapsed configuration.

2. The apparatus of claim 1 wherein said means for removing, expanding and placing includes means for moving said sleeves between said bed and said loader in a direction perpendicular to the side walls of said sleeves.

3. The apparatus of claim 2 wherein said means for removing, expanding and placing permits said sleeves to be expanded before being moved.

4. The apparatus of claim 2 wherein said means for removing, expanding and placing permits said sleeves to be expanded after being moved.

5. The apparatus of claim 1, wherein the sleeves are transported to the apparatus in a container, including means for removing a plurality of collapsed sleeves as a group from said container and placing said group on said bed.

6. The apparatus of claim 5, including clamping means for holding the sleeves in said group together while said group is being removed from the container.

7. The apparatus of claim 1, including means for removing an expanded sleeve from said loading station, collapsing said sleeve and thereafter placing it on said bed.

8. The apparatus of claim 7, including means for inserting a plurality of collapsed sleeves as a group into a container in which they can be transported.

9. The apparatus of claim 1, wherein said means for supporting includes a pair of gates, one of which extends horizontally across each end of said sleeves, and a plurality of fingers mounted on each of said gates which extend inwardly toward said sleeves with at least one of said fingers being located adjacent to each side wall.

10. The apparatus of claim 9, wherein said fingers are individually movably attached to said gates for movement between engaged positions adjacent to their respective side wall and disengaged positions free from said side wall.

11. The apparatus of claim 10, including means for mounting at least one of said gates movably on said bed such that said gate is movable between a closed position where it extends across the ends of said sleeves and an open position where it does not extend across the ends of said sleeves.

12. The apparatus of claim 1, wherein said means for removing sleeves comprises:

(a) hook means for engaging each of said side walls of a sleeve in its collapsed orientation at each end thereof;

(b) means for separating said hook means relative to one another, thereby placing the sleeve in an expanded orientation;

(c) means for raising and lowering said hook means vertically with said sleeve attached thereto; and (d) means for transmitting said hook means horizontally with said sleeves attached thereto, in a direction perpendicular to the side walls of said sleeve.

13. The apparatus of claim 1, wherein said means for removing sleeves comprises:

(a) a carriage;

(b) means for suspending said carriages over said storage means;

(c) means for raising and lowering said carriage;

(d) means for moving said carriage in a direction perpendicular to the side walls of sleeves stored on said storage means;

(e) hooks associates with said carriage, said hooks being arranged in pairs with one hook in each pair engaging one of said side walls and the other hook engaging another of said side walls; and (f) means for moving each pair of hooks toward and away from one another.

14. The apparatus of claim 13, wherein there are two sets of said hook pairs associated with said carriage, one being located above each end of sleeves located on said bed.

* * * * *